(12) United States Patent
Fenster et al.

(10) Patent No.: US 7,302,092 B1
(45) Date of Patent: Nov. 27, 2007

(54) THREE-DIMENSIONAL IMAGING SYSTEM

(75) Inventors: Aaron Fenster, London (CA); Kenneth Dunne, London (CA)

(73) Assignee: London Health Sciences Research Inc. (CA)

( * ) Notice: Subject to any disclaimer, the term of this patent is extended or adjusted under 35 U.S.C. 154(b) by 0 days.

(21) Appl. No.: 09/180,629

(22) PCT Filed: Mar. 20, 1998

(86) PCT No.: PCT/CA98/00247

§ 371 (c)(1),
(2), (4) Date: Nov. 12, 1999

(87) PCT Pub. No.: WO98/43109

PCT Pub. Date: Oct. 1, 1998

(51) Int. Cl.
*G06K 9/00* (2006.01)
*G06K 9/54* (2006.01)

(52) U.S. Cl. ............................ 382/154; 382/128

(58) Field of Classification Search ......... 382/128, 382/131, 305, 154, 307; 128/916; 345/418–424, 345/427, 653
See application file for complete search history.

(56) References Cited

U.S. PATENT DOCUMENTS

| | | | |
|---|---|---|---|
| 5,454,371 A | 10/1995 | Fenster et al. | 128/660 |
| 5,562,095 A | 10/1996 | Downey et al. | |
| 5,782,762 A * | 7/1998 | Vining | 600/407 |

FOREIGN PATENT DOCUMENTS

WO    WO 9700482 A1 * 1/1997

OTHER PUBLICATIONS

"3-D Ultrasound Imaging: A Review", Aaron Fenster and Donal B. Downey, IEEE Engineering In Medicine And Biology.

* cited by examiner

*Primary Examiner*—Von J. Couso
(74) *Attorney, Agent, or Firm*—Katten Muchin Rosenman LLP

(57) ABSTRACT

There is described a three-dimensional imaging system for acquiring a succession of two-dimensional images of a target volume represented by an array of pixels and transforming the succession of two-dimensional images directly into a three dimensional image. Generally, the system comprises a scanner, a memory and a transformation means. The scanner scans the target volume using an angular scanning technique, and generates a succession of digitized two-dimensional images thereof representing cross-sections of the target volume on a plurality of planes spaced around an axis of rotation of the scanner. The memory stores the succession of digitized two-dimensional images and a data set. The data set comprises: (i) calibration parameters defining the geometric relationship between successive digitized two-dimensional images; and (ii) acquisition parameters defining the geometric and orientational relationship between successive digitized two-dimensional images. The transformation means receives the digitized two-dimensional images and the data set, and transforms the digitized two-dimensional images directly into a three-dimensional image of at least a portion of the target volume. The system is particularly suited to display a three-dimensional image from two-dimensional images which are acquired by a fan- or axially-acquired ultrasound image data.

13 Claims, 7 Drawing Sheets

THREE-DIMENSIONAL IMAGING SYSTEM

BACKGROUND OF THE INVENTION

1. Field of the Invention

The present invention relates to the field of three-dimensional imaging. More specifically, the present invention relates to a method and to a system for the reconstruction of ultrasound image data using an angular scanning technique producing a plurality of planes spaced around an axis of rotation of a scanning means used to acquire the image data.

2. Description of the Prior Art

Three-dimensional (3D) ultrasound imaging is a technique in which a set of spatially related two dimensional ultrasound slices (tomograms) of a target are collected and mathematically converted to create a virtual Cartesian ultrasound volume. This virtual ultrasound volume facilitates the visualization of non-acquired slices of the target and a variety of rendered surfaces and projections of the target otherwise unobtainable using two-dimensional (2D) ultrasound imaging.

High fidelity 3D ultrasound requires, by definition, a data set in which the spacial relationship between the individual ultrasound slices is precisely known. High fidelity ultrasound is important for the accurate assessment of volumes and the appreciation of target geometry. The conventional method of choice for obtaining the precise spatial relationship between ultrasound slices is to actively constrain the position of each ultrasound slice. This is achieved by controlling the position of the ultrasound probe during generation of the slices by use of a motorized positioning device (mechanical scanning). Examples of 3D ultrasound imaging systems are described in detail in U.S. Pat. Nos. 5,454,371 (Fenster et al.) and 5,562,095 (Downey et al.), the contents of each of which are hereby incorporated by reference.

In the three-dimensional ultrasound imaging systems described in the afore-mentioned United States patents, when a succession of two-dimensional images have been captured and digitized, the two-dimensional images are stored as a stack to form an image data array. Before a three-dimensional image of the scanned volume can be created and viewed by a user, the image data array must be reconstructed to form a volumetric image array. This type of reconstruction, in which every pixel in every two-dimensional image slice is converted into an appropriate voxel in an image volume (i.e. volumetric image array) prior to display is known as "full volume" reconstruction. Full volume reconstruction is shown schematically on the left-hand side of FIG. 1. All the data points (represented by X and O) on each of the individual two-dimensional image slices (collectively A) are generated into a single complete volume array (B). Once the complete volume array has been generated, a selected view of the volume set may be displayed on a monitor (C) by sampling the volume array along selected planes. The generation of the complete volume array is somewhat inefficient, i.e. it is a time-consuming intermediate stage. Full volume reconstruction and display of a three-dimensional image using a conventional hardware platform can take upward of one minute and, therefore, has limited application in situations where immediate display of an acquired image is desirable.

In an attempt to overcome the drawbacks associated with full volume reconstruction, the applicants developed a so-called "fast-linear" reconstruction process which is described in co-pending U.S. patent application Ser. No. 08/562,590 (which corresponds to International patent application serial number PCT/CA96/00777), the contents of which are hereby incorporated by reference.

In fast-linear reconstruction, only the specific image data from the two-dimensional image slices that are actually required to view the user-selected image undergoes reconstruction. In other words, only the image data necessary to view the surface of user-selected image (i.e. as opposed to all of the data representing the entire volume of the target) is used for reconstruction. The fast-linear reconstruction technique is shown schematically on the right-hand side of FIG. 1. If, for example, the users wishes to view a particular image (C) of the target volume, the computer uses associated calibration and aquisition parameters of the collected two-dimensional image slices (A) to determine special "look-up" tables (D) which speed up the determination of which data points from the two-dimensional image slices are required to be displayed on the monitor. In the scenario illustrated in FIG. 1, only the "O" two-dimensional data points necessary to produce the desired image are reconstructed. There is no necessity to construct a full volume image array. Accordingly, this fast-linear reconstruction is more efficient than conventional full volume reconstruction, i.e. it is less time-consuming (less than ½ second).

The fast-linear reconstruction method and system described in co-pending U.S. patent application Ser. No. 08/562,590, can be used to facilitate the display of three-dimensional images of target volumes by the reconstruction of parallel two-dimensional images slices (shown schematically in FIG. 2A) which have been acquired using a linear scanning path. The method and system described may also be utilized when the parallel image slices are uniformly tilted with respect to the scanning axis (shown schematically in FIG. 2B).

It is an object of the present invention to provide a system and method for so-called "fast" reconstruction of fan- and axially-acquired ultrasound data which obviates and mitigates at least one of the disadvantages of the prior art.

SUMMARY OF THE INVENTION

Accordingly, in one aspect, the present invention provides a three-dimensional imaging system for acquiring a succession of two-dimensional images of a target volume represented by an array of pixels and transforming the succession of two-dimensional images directly into a three dimensional image, the system comprising:

scanning means to: (i) scan the target volume using an angular scanning technique, and (ii) generate a succession of digitized two-dimensional images thereof representing cross-sections of the target volume on a plurality of planes spaced around an axis of rotation of the scanning means;

memory means storing the succession of digitized two-dimensional images and a data set, the data set comprising: (i) calibration parameters defining the geometric relationship between successive digitized two-dimensional images; and (ii) acquisition parameters defining the geometric and orientational relationship between successive digitized two-dimensional images; and transformation means for: (i) receiving the digitized two-dimensional images and the data set, and (ii) transforming the digitized two-dimensional images directly into a three-dimensional image of at least a portion of the target volume.

In another aspect, the present invention provides a method of transforming a succession of two-dimensional images of a target volume represented by an array of pixels directly into a three dimensional image, the method comprising the steps of:

scanning the target volume along an angular scanning path;

generating a succession of digitized two-dimensional images representing cross-sections of the target volume on a plurality of planes spaced around an axis of rotation of the scanning means;

storing the succession of digitized two-dimensional images in a memory;

storing a data set in the memory, the data set comprising (i) calibration parameters defining the geometric relationship between successive digitized two-dimensional images; and (ii) acquisition parameters defining the geometric and orientational relationship between successive digitized two-dimensional images;

accessing the digitized two-dimensional images and the calibration file; and transforming the digitized two-dimensional images directly into a three-dimensional image of at least a portion of the target volume.

As used throughout this specification, the term "target volume" refers to the particular area within a subject which a user wishes to image. The target volume is not fixed and does not necessarily include, for example, an entire organ in a patients body. Further, the target volume which is displayed as a three-dimensional image is not necessarily the entire volume encompassed during acquisition of the two-dimensional image slices.

BRIEF DESCRIPTION OF THE DRAWINGS

Embodiments of the present invention will be described, by way of example only, with reference to the accompanying drawings, in which.

DETAILED DESCRIPTION OF THE PREFERRED EMBODIMENTS

Figure 3:
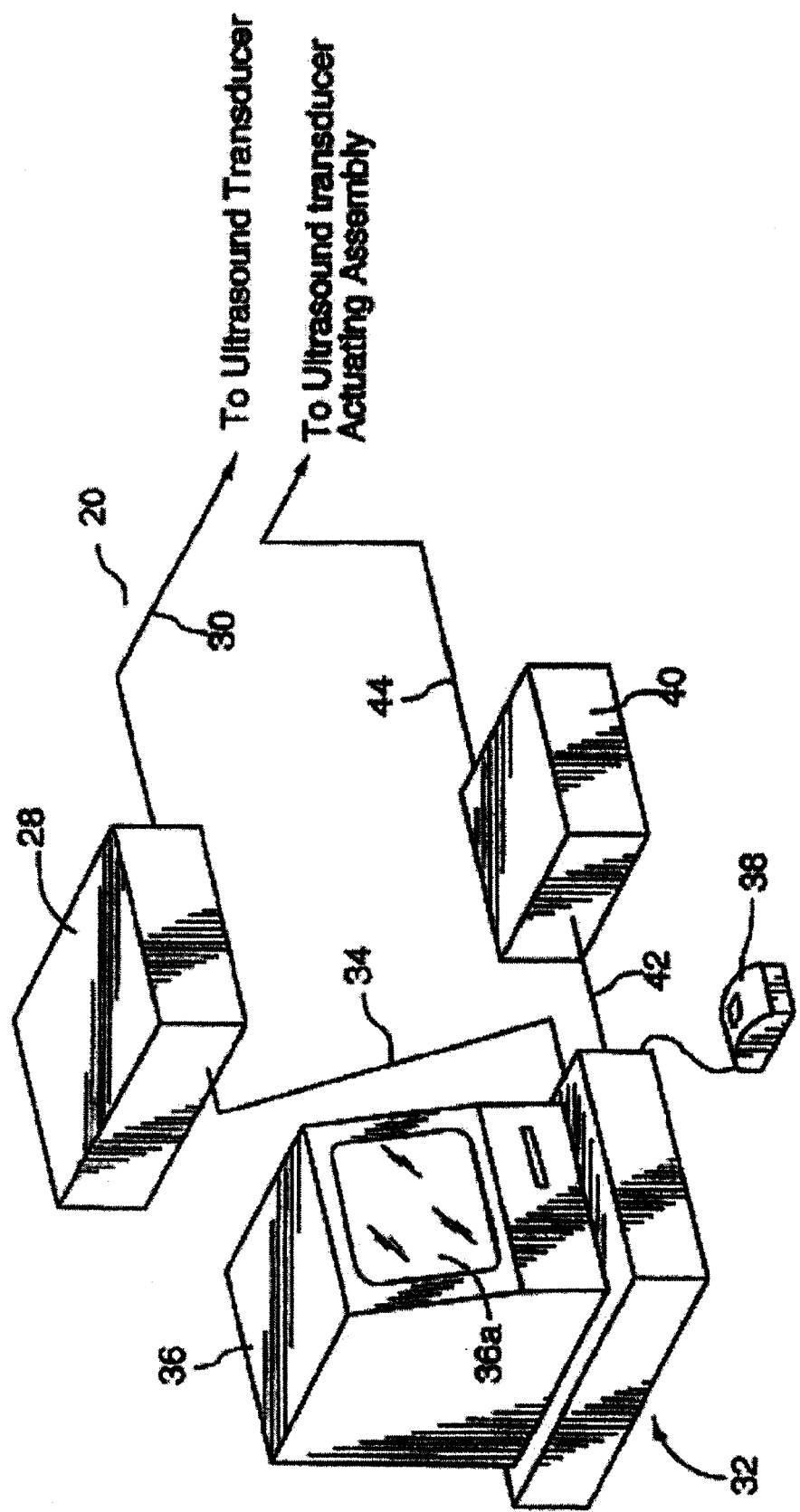
FIG. 3 is a perspective view of a three-dimensional imaging system.

A three-dimensional imaging system in accordance with the present invention is indicated generally at 20 in FIG. 3. System 20 is capable of generating three-dimensional ultrasound images of a target volume of a subject from a succession of two-dimensional ultrasound image slices of the target volume. The subject under examination may be animate or inanimate. In the former case, system 20 may be used as a diagnostic tool or during clinical procedures to provide updated images of the target volume in real-time.

System 20 includes an ultrasound transducer actuating assembly (not shown) for removably attaching an ultrasound transducer (not shown). The transducer actuating assembly is designed to move the transducer along an angular scanning path so that a succession of spatially, angularly related two-dimensional image slices can be generated.

As used throughout this specification, the term "angular scanning path" is intended to have a broad meaning and is meant to encompass any non-linear scanning path, i.e. any scanning path in which the succession of two-dimensional image slices generated are not parallel to one-another. Non-limiting examples of angular scanning paths are "fan" and "axial" scanning, both of which are be known and understood by a person of skill in the art.

Further, as used throughout this specification, the term "angularly related" is intended to have a broad meaning and indicates that the relationship between successive two-dimensional image slices may be defined in terms of a pre-determined rotational component.

The transducer is connected to an ultrasound machine 28 via a communication line 30. Ultrasound machine 28 in turn is connected to a computer 32 via communication line 34. Computer 32 includes a keyboard (not shown), a monitor 36 with a display screen 36a and a graphical input device 38 such as a mouse. It will be apparent that many other input means can be used to input commands to the computer, such as voice input via microphone, joystick, control knobs, trackball and mechanical sliders. Computer 32 provides output signals to a controller 40 via communication line 42 which in turn provides control signals to the transducer actuating assembly via communication line 44 to control the angular scanning motion of the transducer.

Types of transducers and transducer actuating assemblies which may be utilized in the system of the present invention to produce the succession of spatially, angularly related two-dimensional image slices, are not particularly limited and the choice of a suitable combination is believed to be within the purview of a person of skill in the art.

The selection of a suitable combination of transducer, transducer actuating assembly and ultrasound machine settings will be dependent on a number of factors, such as: the type of subject, the location within the subject of the target volume to be scanned, the presence of obscuring anatomy and the like.

Examples of suitable transducers and transducer actuating assemblies and their operation of which are described in U.S. Pat. Nos. 5,454,371 (Fenster et al.) and 5,562,095 (Downey et al.) and *IEEE Engineering in Medicine and Biology*, 15 41-52 (1996), the contents of each of which are hereby incorporated by reference.

Although the present invention will be described with reference to two-dimensional image slices generated by transducers in combination with transducer actuating assemblies, its is equally applicable to image slices generated with so-called "free-hand" scanning techniques, which are known to persons of skill in the art and are described in copending Unites States (provisional) patent application filed on even date and in Fenster et al., *IEEE Engineering in Medicine and Biology*, 15, 41-52, (1996).

In use, the succession of reflected ultrasound signals received by the transducer are conveyed to ultrasound machine 28 where a succession of two-dimensional images of the target volume are generated. Each two-dimensional image represents a cross-section of the target volume having x and y dimensions.

Since the velocity of the transducer along the angular scan path, the geometry of the scan path and the ultrasound signal transmit interval can be readily configured during the acquisition stage, the relative spacial and angular position of the succession of two-dimensional images can be determined. Accordingly, the relationship between individual pixels within each image slice and within adjacent image slices, can be expressed in terms of an algorithm.

The two-dimensional images generated by ultrasound machine 28 are conveyed to computer 32 via communication line 34. Computer 32 digitizes the previously analog two-dimensional images and stores the digitized images. Preferably, computer 32 also stores a data set which contains data defining (i) calibration parameters defining the geometric relationship between successive digitized two-dimensional images; and (ii) acquisition parameters defining the geometric and orientational relationship between successive digitized two-dimensional images. A more detailed description of the contents of the data set will be provided below.

Figure 4:
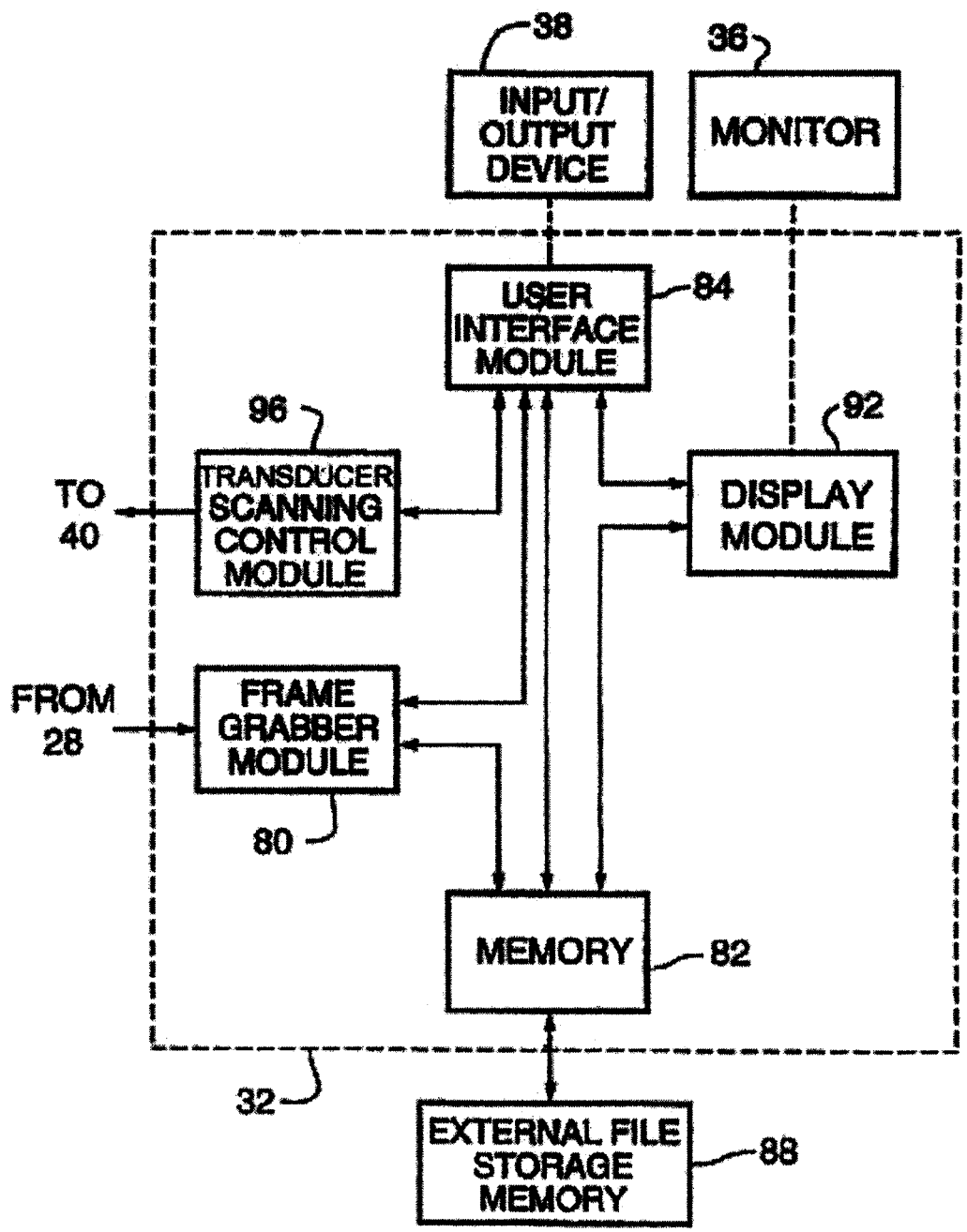
FIG. 4 is a block diagram showing various hardware and software modules of the computer forming part of the system illustrated in FIG. 3.

A block diagram illustrating some of the preferred hardware/software modules/functions of computer 32 is provided in FIG. 4. As illustrated, computer 32 includes a frame grabber module 80, such as an IMAXX Video Capture Board manufactured by Precision Digital Image Corporation of Redmond, Wash., to process the two-dimensional analog images received from ultrasound machine 28. Specifically, frame grabber module 80 captures and digitizes the succession of two-dimensional analog images and stores them in a local physical memory 82.

Computer 32 also includes a user interface module 84 for interpreting input commands received via a graphical input device 38. As will be appreciated by those of skill in the art, user interface module 84 controls and co-ordinates the operation of the other modules of system 20 in response to input from the graphical input device 38 allowing the user to control the system in the desired manner.

Once a succession of two-dimensional images of the target volume has been captured and digitized by frame grabber module 80 and stored in physical memory 82, it may be transferred, if desired, to an external file storage memory 88. The digitized two dimensional images, whether stored locally or externally, may be processed by a display module 92 in response to input commands received from graphical user interface 38 so that a three-dimensional image of the target volume can be displayed on screen 36a of monitor 36.

Computer 32 also includes a transducer scanning control module 96 which provides output signals to controller 40 to actuate the transducer actuating assembly. Transducer scanning control module 96 receives input from user interface module 84.

As described hereinabove, the relative spacial and angular position of the succession of two-dimensional images can be determined and, accordingly, the relationship between individual pixels within each image slice and within adjacent image slices, can be expressed in terms of an algorithm. Using this information, which preferably forms part of the data set, and knowledge of the location of each individual two-dimensional image slice within the computer memory, display module 92 can reconstruct a three-dimensional image of the target volume without the requirement for full volume reconstruction.

In order for display module 92 to be able to act directly on the digitized two-dimensional image slices, the data set preferably includes:

(i) calibration parameters defining the geometric relationship between successive digitized two-dimensional images; and
(ii) acquisition parameters defining the geometric and orientational relationship between successive digitized two-dimensional images.

More specifically, for fast-fan reconstruction (i.e. reconstruction of a three-dimensional image from a succession of two-dimensional images acquired using a fan scanning technique) and for fast-axial reconstruction (i.e. reconstruction of a three-dimensional image from a succession of two-dimensional images acquired using an axial scanning technique), the data set preferably includes:

(i) an address pointer defining the address of the location in the computer memory in which the acquired digitized two-dimensional image data starts—this may be known by the invocation of the viewing program;
(ii) the horizontal and vertical voxel sizes of the acquired images;
(iii) the location of the axis of rotation of the transducer with respect to each of the succession of images;
(iv) the width and height (i.e. x and y) of each acquired image and the total number of acquired images;
(v) the relative orientation of each acquired image to the transducer actuating assembly;
(vi) the angular separation of each acquired image; and
(vii) the total angle of acquisition.

Additionally and preferably, for fast-axial reconstruction, the data set further includes data defining:

(viii) the degree of out-of-plane tilt of the transducer, if any;
(ix) the degree of out-of-plane displacement, if any; and
(x) the degree of in-plane tilt, if any.

Of the foregoing ten types of information in the data set, items (ii), (iii), (viii), (ix) and (x) are considered to be calibration parameters which originate from a calibration procedure performed on the transducer, transducer actuating assembly and an ultrasound machine to which the transducer is attached, prior to image acquisition. These parameters are used to partially define the acquired image geometry.

Items (iv), (v), (vi), and (vii) are considered to be acquisition parameters which originate at the time of image slice generation. These parameters are also used to partially define the acquired image geometry and also used to define the orientation of the data.

Before acquiring two-dimensional images of a target volume using system 20, the calibration parameters must be defined. Specifically, frame grabber module 80 is programmed to write the acquired digitized ultrasound image data to the appropriate locations of physical memory 82 and to generate an address pointer which in turn is stored in the data set in physical memory 82. Further, during calibration, the velocity of the transducer along the angular scanning path and the ultrasound signal transmit interval are determined so that the number of two-dimensional image slices of the target volume to be taken are known. Also, the number of pixels along the x and y axis of the two-dimensional images are measured. The number of pixels in the x and y directions defines the edges of each two-dimensional ultrasound image. These numbers may be used to locate the ultrasound image data within the scanned target volume. Once the numbers are determined they are also stored in the data set.

During calibration of the transducer/transducer actuating assembly, the centre to centre distance between two pixels in the same line of an ultrasound image (i.e. in the x direction)

are determined and the centre to centre distance between adjacent pixels in two different lines of the ultrasound image are determined (i.e. in the y direction). During the determination of the distances between the pixels mentioned above, only a few sample measurements between two pixels in the x-direction of an ultrasound image, two pixels in the direction of the same ultrasound image are taken and average distances are determined. Further, a determination of the axis of rotation of the transducer is also made. Calibration is more fully described in U.S. Pat. Nos. 5,454,371 (Fenster et al.) and 5,562,095 (Downey et al.) and *IEEE Engineering in Medicine and Biology,* 15 41-52 (1996), the contents of each of which are hereby incorporated by reference.

Since the velocity of the transducer along the angular scanning path is constant (or may be assumed to be constant), the ultrasound signal transmit interval (i.e., frame rate) is known and the total angle of acquisition is known, the distance between corresponding pixels in adjacent two-dimensional ultrasound images may be calculated. Once these distances are determined, the distance values are stored in the data set.

Prior to performing axial scanning, the degree of in-plane and out-of-plane tilt of the transducer, as well as the degree of out-of-plane displacement of the transducer are also pre-measured and this information is stored in the data set. In-plane tilting is the angle that the axis of rotation, projected onto each image plane, makes with a vertical centerline of the image plane. Out-of-plane tilting offsets occur when the two-dimensional images are captured at an angle to the theoretical scanning axis of the transducer. Out-of-plane displacement offsets occur when the two-dimensional images are captured "off-centre" from the theoretical scanning axis, i.e. when the actual scanning axis of the transducer is parallel to, but displaced from, the theoretical scanning axis. It is desirable to compensate for these offsets so that inaccuracies in the final reconstructed image (leading to distortion of the final three-dimensional image) do not occur. Once the above data is stored in the data set in physical memory 82, the data set may be transferred to and stored in external file storage memory 88.

A determination is then made of the so-called acquisition parameters, i.e, the width and height (i.e. x and y) of each acquired image and the total number of acquired images; the relative orientation of each acquired image to the transducer actuating assembly; the angular separation of each acquired image; and the total angle of acquisition.

The actual steps of data acquisition, whether using fan or axial acquisition, and the visual confirmation that the target volume has been imaged using two-dimensional image display, are conventional and will not be described in detail herein. A more extensive discussion may be found in U.S. Pat. Nos. 5,454,371 (Fenster et al.) and 5,562,095 (Downey et al.), both of which are incorporated herein by reference.

Figure 1:
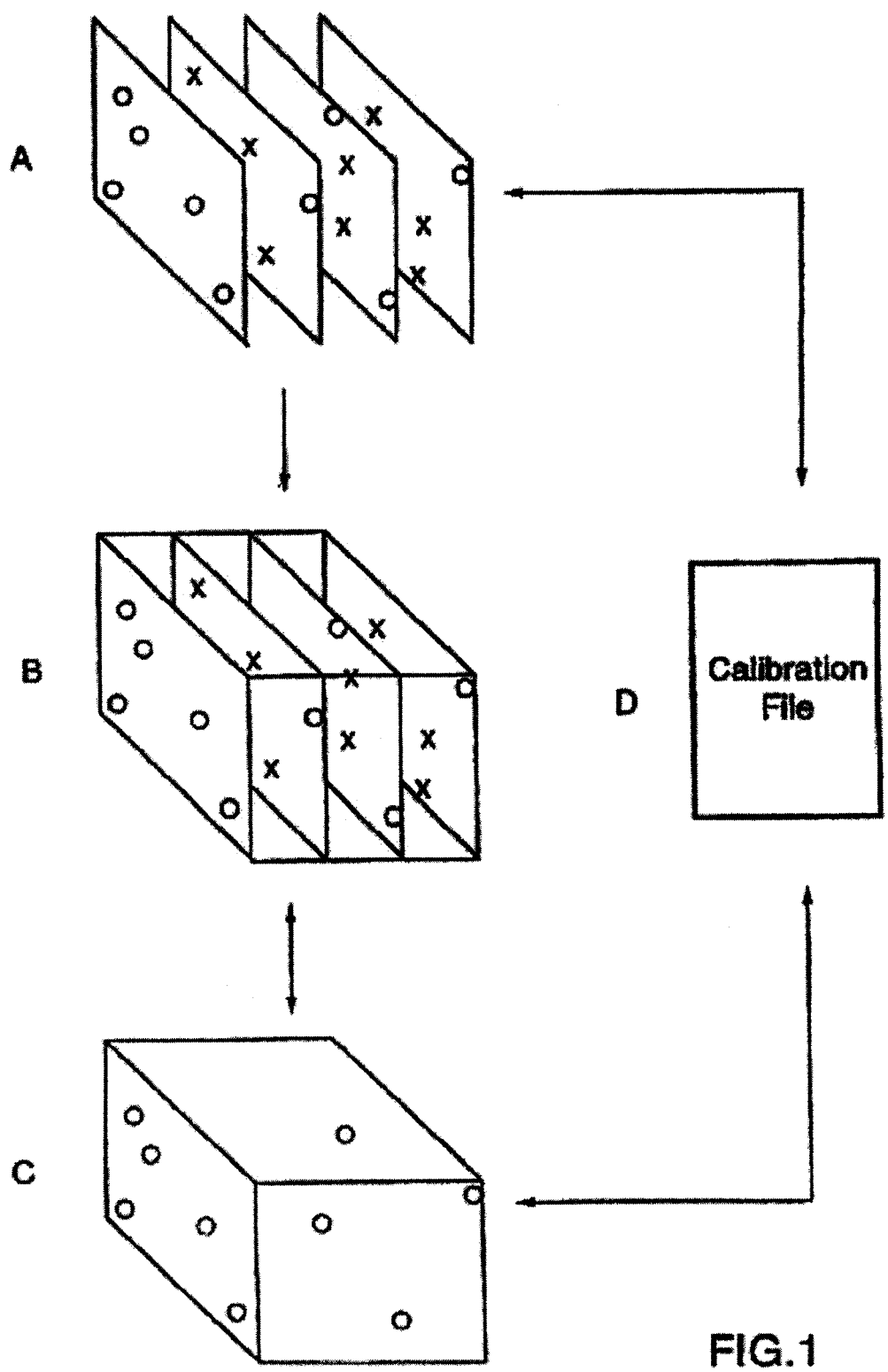
FIG. 1 is a schematic representation of two image reconstruction techniques of the prior art.
Figure 2A:
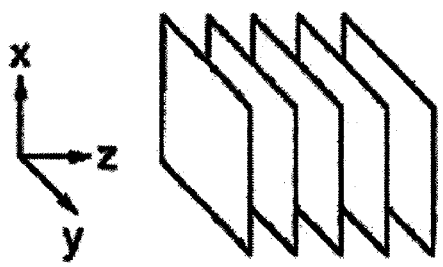
FIGS. 2A and 2B each are, respectively, a schematic representation of successive, linearly acquired, two-dimensional image slices which may be reconstructed using the techniques of the prior art.
Figure 2B:
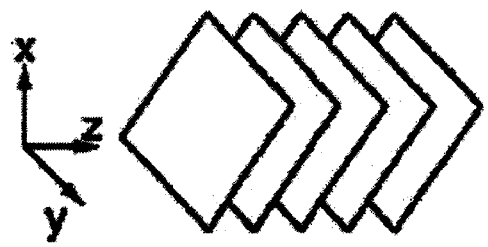
Figure 5:
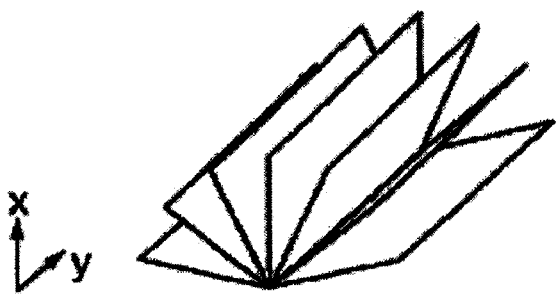
FIG. 5 is a schematic representation of successive, two-dimensional image slices acquired using a fan scanning technique.
Figure 6:
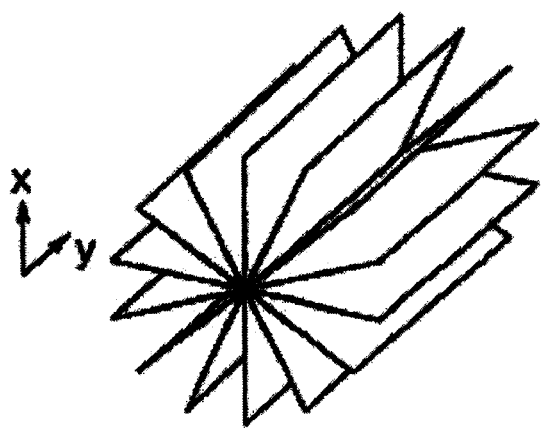
FIG. 6 is a schematic representation of successive, two-dimensional image slices acquired using an axial scanning technique.

FIGS. 5 and 6 show schematic representations of a succession of two-dimensional image planes acquired using fan and axial scanning techniques, respectively.

In a preferred embodiment, the data set is used to construct a "reverse map" for each type of data. A reverse map is a look-up table or a partial look-up table, which is used to determine the location within the succession of two-dimensional image slices of the particular pixels which must be retrieved from memory to produce the three-dimensional display image selected by the user. The reverse map is a static structure which, due to its small size relative to the volume data, allows for high-speed access to the volume data from planar samplings of the data. The principle of reverse mapping is known to those of skill in the art and will not be described in detail herein. A discussion of reverse mapping may be found in "Digital Imaging Warping", George Wolberg, IEEE Press, 1990, the contents or which are incorporated herein by reference.

Figure 7A:
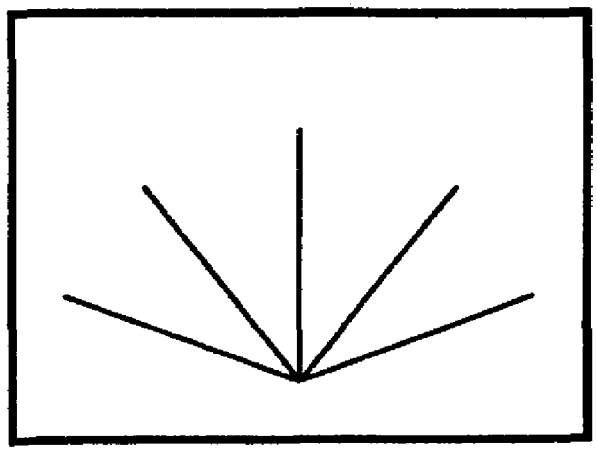
FIGS. 7A and 7B are isomorphic planes of the two-dimensional image slices acquired using fan and axial acquisition techniques, respectively.
Figure 7B:
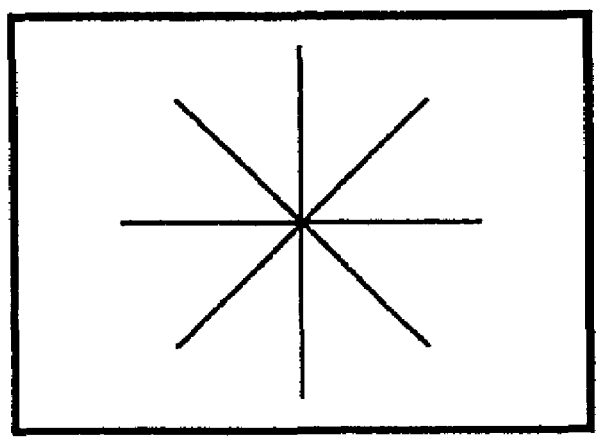

In the present system, the particular type of reverse map utilized preferably is a two-dimensional structure. Notionally, this structure can be considered to a grid overlaying a Cartesian coordinate system that stores a partial mapping of Cartesian coordinates onto the acquired data pixels. The reverse map grid lies within a plane that is representative of isomorphic acquisition data planes (i.e. the plane shown in FIGS. 7A and 7B for fan data and axial data, respectively). These isomorphic planes are orthogonal to, and encompass an edge of, each plane in the succession of two-dimensional image slices.

Figure 8:
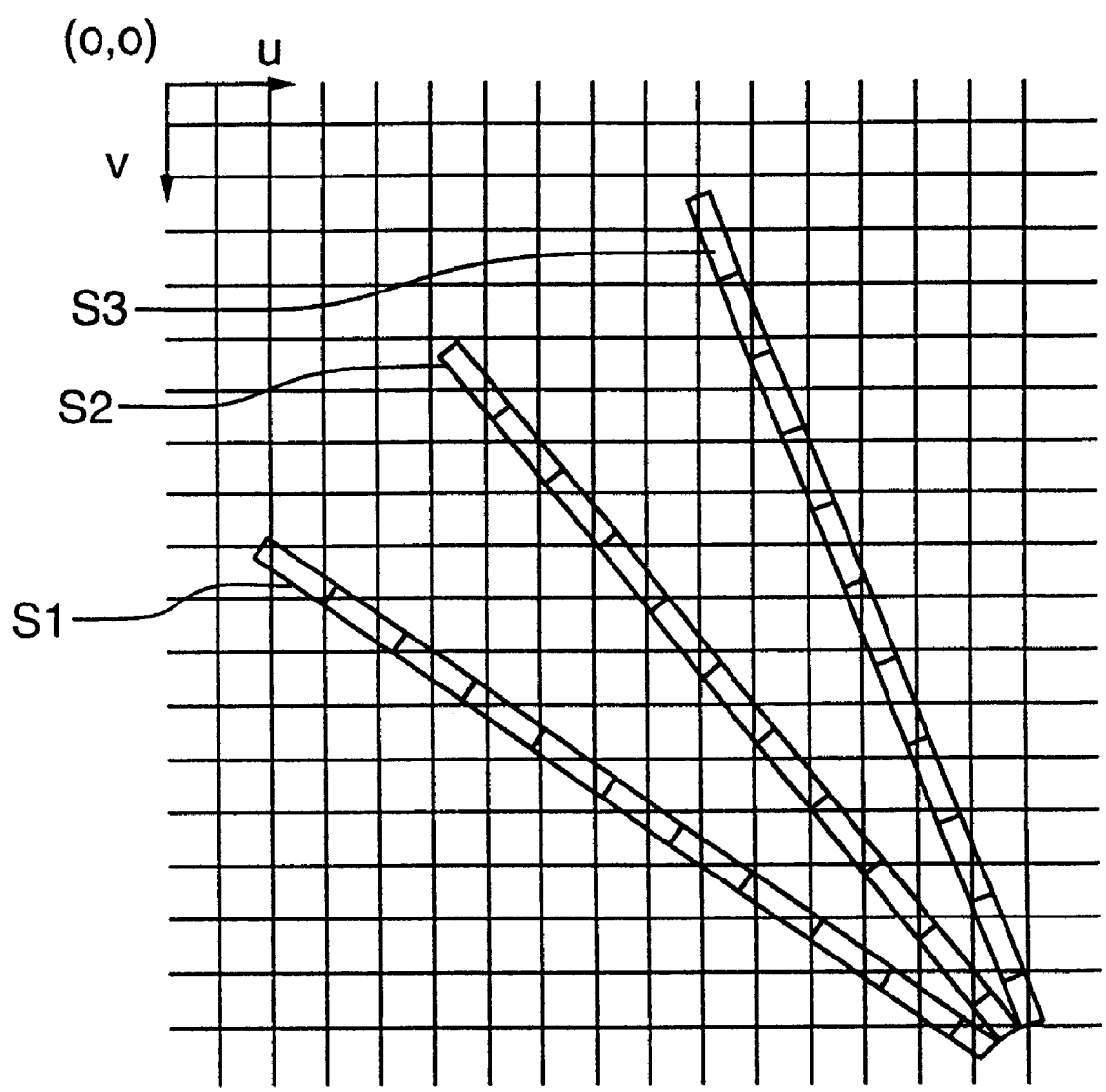
FIG. 8 is a schematic representation of a reverse map.

A schematic representation of a reverse map is shown in FIG. 8. In FIG. 8, U and V are Cartesian coordinates having an origin (0,0) at the top left-hand corner. S1, S2 and S3 are edge views of successive acquired two-dimensional image slices.

Figure 9A:
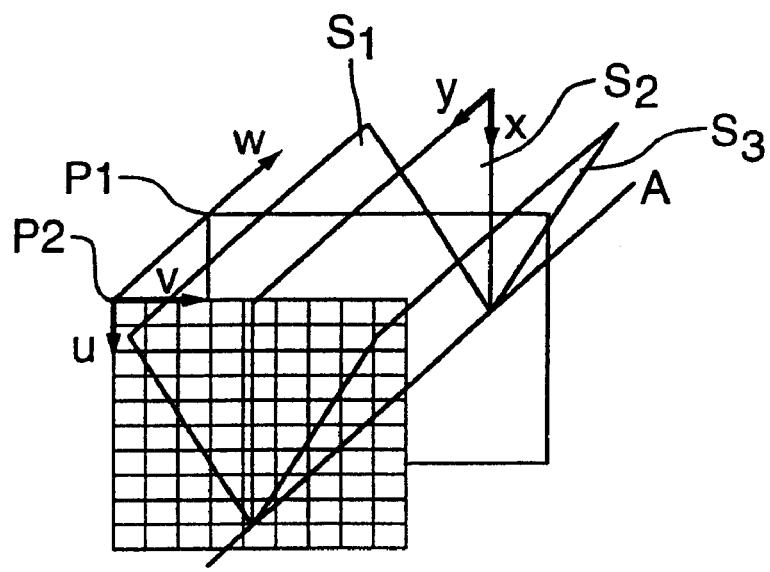
FIGS. 9A and 9B are a schematic representations showing the relationship between the two-dimensional image data and its reverse map for fan and axial acquisition, respectively.
Figure 9B:
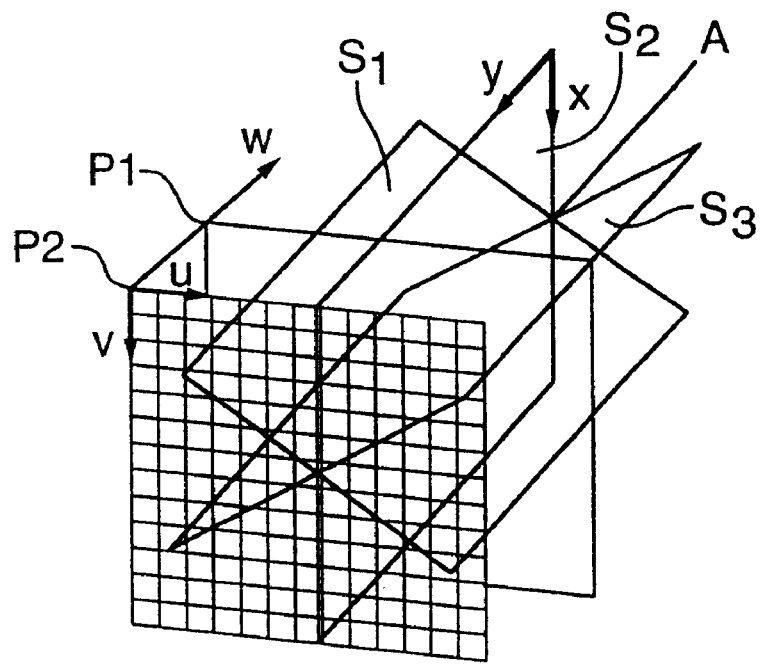

Using this particular embodiment of a reverse map (i.e. one in which the map encloses the edges of each two-dimensional image slice ("raw frame") and is oriented in a plane orthogonal to all raw frames), a look-up table is made which provides a partial index of the raw data within each image slice when this table is indexed by the two appropriate output three-dimension coordinates (U,V) (see FIGS. 9A and 9B). The complete index into the raw data is formed from this partial index and the last output three-dimensional coordinate (W) in conjunction with the acquisition (i.e., orientation) parameters.

In FIGS. 9A and 9B, x and y are the dimensions of the two-dimensional image slices and z is the slice of "frame" number. "A" indicates the axis or rotation for each type of data acquisition. P1 and P2 indicate the planes bounding the isomorphic sections of the raw data. The position of these planes will be dependent on the size and type of any offsets which occur in the acquisition of the two-dimensional image slices.

The coarseness of the transformation of display pixels into acquired data pixels is determined by the pre-defined horizontal and vertical dimensions of the reverse map.

The two-dimensional reverse map, as described above, can be used to provide immediate reconstruction of an image, rather than a larger (and therefore slower) three-dimensional reverse map. The reverse map technique can be used, for example, to texture the surfaces of a displayed so-called "image cube" or to render internal surfaces of a bounding region.

Because the two-dimensional reverse map of the present invention exploits the isomorphic symmetery present in rotationally acquired two-dimensional image sets, each location in the reverse map caches that part of the index into the raw data that is common to several locations within a reconstructed version of the raw data.

In use, once the data in the data set has been defined and the two-dimensional data acquisition has been completed, a default three-dimensional image of the target volume is displayed on the screen of the monitor. This default view may be, for example, a perspective view of a reconstruction of the outer surface of the entire target volume. This three-dimensional image may be manipulated by the user using the technique described in detail in U.S. Pat. Nos. 5,454,371 (Fenster et al.) and 5,562,095 (Downey et al.), the contents of each of which are hereby incorporated by reference.

As the image is manipulated and a new view of the target volume is required (for example, a portion of the default view of the target volume), the display module uses the reverse map to determine which specific data points within which of the stored two-dimensional image slices, are required to generate the required image. It is these specific data points, and only these data points, that are reconstructed into the displayed image.

It will be apparent to a person of skill in the art, that it is not necessary to use a reverse map to provide rapid reconstruction of a three-dimensional image from the raw data once the calibration and orientation parameters are known. For example, it is possible to use a forward mapping technique in which the planar views of the desired image can be splatted by data values. The principles of this technique are discussed in "Digital Imaging Warping", George Wolberg, IEEE Press, 1990, the contents or which are incorporated herein by reference.

While this invention has been described with reference to an illustrative embodiment, this description is not intended to be construed in a limiting sense. Various modifications of the illustrative embodiments as well as other embodiments will be apparent to persons of skill in the art. It is therefore contemplated that the appended claims will cover any such modifications or embodiments.

What is claimed is:

1. A three-dimensional imaging system for acquiring a succession of two-dimensional images of a target volume represented by an array of pixels and transforming the succession of two-dimensional images directly into a three dimensional image, the system comprising:
   scanning means to: (i) scan the target volume using an angular scanning technique, and (ii) generate a succession of digitized two-dimensional images thereof representing cross-sections of the target volume on a plurality of planes spaced around an axis of rotation of the scanning means;
   memory means storing the succession of digitized two-dimensional images and a data set, the data set comprising: (i) calibration parameters defining the geometric relationship between successive digitized two-dimensional images; and (ii) acquisition parameters defining the geometric and orientational relationship between successive digitized two-dimensional images; and
   transformation means responsive to user selection of a three-dimensional image surface to be displayed, said transformation means receiving the digitized two-dimensional images and the data set, and transforming a portion of the image data within the received two-dimensional images that is necessary to view the selected three-dimensional image surface, wherein the portion that is transformed is less than all of the image data within the received two-dimensional images.

2. An imaging system as defined in claim 1, wherein the angular scanning technique is an axial scanning technique.

3. An imaging system as defined in claim 1, wherein the angular scanning technique is a fan scanning technique.

4. An imaging system as defined in claim 1, wherein the data set includes data defining:
   (i) an address pointer defining the address of the location in the computer memory in which the acquired digitized two-dimensional image data starts
   (ii) the horizontal and vertical voxel sizes of the acquired images;
   (iii) the location of the axis of rotation of a transducer with respect to each of the succession of images;
   (iv) the width and height (i.e., x and y) of each acquired image and the total number of acquired images;
   (v) the relative orientation of each acquired image to the transducer actuating assembly;
   (vi) the angular separation of each acquired image; and
   (vii) the total angle of acquisition.

5. An imaging system as defined in claim 2, wherein the data set further includes data defining:
   (viii) the degree of out-of-plane tilt of the transducer;
   (ix) the degree of out-of-plane displacement; and
   (x) the degree of in-plane tilt.

6. An imaging system as defined in claim 1, wherein the calibration parameters comprise (i) the horizontal and vertical voxel sizes of the acquired images; and (ii) the location of the axis of rotation of the transducer with respect to each of the succession of images.

7. An imaging system as defined in claim 6, wherein the calibration parameters further comprise (iii) the degree of out-of-plane tilt of the transducer; (iv) the degree of out-of-plane displacement; and (v) the degree of in-plane tilt.

8. An imaging system as defined in claim 1, wherein the acquisition parameters comprise (i) the width and height (i.e., x and y) of each acquired image and the total number of acquired images; (ii) the relative orientation of each acquired image to the transducer actuating assembly; (iii) the angular separation of each acquired image; and (iv) the total angle of acquisition.

9. An imaging system as defined in claim 4, wherein item (iv) comprises the number of pixels along the x and y axis of each two-dimensional image and the total number of two-dimensional images taken.

10. An imaging system as defined in claim 4, wherein item (ii) comprises the physical distance between the centres of adjacent pixels in both the x and the y directions in each two-dimensional image.

11. An imaging system as defined in claim 1, wherein the transformation means includes a means to generate a reverse map.

12. An imaging system as defined in claim 11, wherein the reverse map encloses edges of each two-dimensional image and is oriented in a plane orthogonal to the planes of the two-dimensional images.

13. A method of transforming a succession of two-dimensional images of a target volume represented by an array of pixels directly into a three dimensional image, the method comprising the steps of:
   scanning the target volume along an angular scanning path:
   generating a succession of digitized two-dimensional images representing cross-sections of the target volume on a plurality of planes spaced around an axis of rotation of the scanning means;
   storing the succession of digitized two-dimensional images in a memory;
   storing a data set in the memory, the data set comprising (i) calibration parameters defining the geometric relationship between successive digitized two-dimensional images; and (ii) acquisition parameters defining the geometric and orientational relationship between successive digitized two-dimensional images;
   accessing the digitized two-dimensional images and a calibration file; and transforming the digitized two-dimensional and the data set representing the three-dimensional image, and transforming (i) less than all of the image data within the received two-dimensional images, and (ii) the portion of the image data which represents an edge of the target volume that is necessary to view at least a portion of the selected three-dimensional image surface.

* * * * *